United States Patent [19]

Ames

[11] 4,167,142
[45] Sep. 11, 1979

[54] CONVERTIBLE RAILWAY CAR SHIFTING LOCOMOTIVE

[75] Inventor: Victor H. Ames, Midlothian, Ill.

[73] Assignee: Whiting Corporation, Harvey, Ill.

[21] Appl. No.: 844,309

[22] Filed: Oct. 21, 1977

[51] Int. Cl.² .................. B61C 9/08; B61C 11/00; B61C 13/00; B61C 15/00

[52] U.S. Cl. .................. 105/26 R; 105/26.1; 105/90 A; 105/120; 105/215 C

[58] Field of Search .............. 105/26 R, 26.1, 29 R, 105/49, 73, 75, 120, 121, 131, 133, 215 C, 90 A

[56] References Cited

U.S. PATENT DOCUMENTS

| | | | |
|---|---|---|---|
| 353,395 | 11/1886 | Adams | 105/121 X |
| 2,718,195 | 9/1955 | Bock et al. | 105/75 X |
| 2,718,197 | 9/1955 | Bock et al. | 105/26.1 X |
| 2,721,522 | 10/1955 | Ames | 105/26.1 X |
| 2,722,897 | 11/1955 | Morey | 105/26.1 X |
| 3,198,137 | 8/1965 | White, Jr. | 105/73 X |
| 3,232,241 | 2/1966 | White, Jr. | 105/75 |
| 3,420,191 | 1/1969 | White, Jr. | 105/26 R |
| 3,540,381 | 11/1970 | White, Jr. | 105/215 C X |
| 3,709,153 | 1/1973 | Herscovitch | 105/73 X |
| 3,884,156 | 5/1975 | Ames et al. | 105/75 |
| 3,892,187 | 7/1975 | White, Jr. | 105/75 |
| 4,067,259 | 1/1978 | Ames et al. | 105/75 X |

*Primary Examiner*—Albert J. Makay
*Assistant Examiner*—Howard Beltran
*Attorney, Agent, or Firm*—Lockwood, Dewey, Alex & Cummings

[57] ABSTRACT

An improved rail car moving vehicle adapted for travel alternately in one mode on rail wheels on a railway track and in an off-track mode on ground wheels, with weight transfer capabilities from a coupled railway car when in the on-rail mode, and characterized by improvements, including: a tricycle configuration of ground wheels provided by a pair of non-steerable, closely-spaced rear road wheels adapted to have frictional driving engagement with the driven axle of a rail wheel set and relatively widely-spaced steerable front ground wheels; a frame design that provides ample strength with respect to a bending or vertical load while having torsional rigidity not sufficient to normally cause one of the rail wheels to lift off from the track more than the radial dimension of its flange; a rear coupler assembly including a coupler carrier independently hinged to the vehicle frame for supporting a laterally swinging coupler independently pivoted to the frame at the inner end of the coupler arm; a pair of steerable road wheels spaced outboard of the vehicle frame and adjacent rail wheels and mounted on caster means supported from a pivot pipe with a tie rod interconnecting the steering levers; and, crank shafts mounted on opposite ends of a transverse-driven axle disposed above the axles of the front and rear rail wheel sets whereby side rods of inverted V configuration interconnecting the rail wheels with the crank arms on opposite ends of the driven axle, even in their lowest position, have adequate road bed and rail clearance and a final drive gear on the axle and a disc brake rotor mounted thereon can have relatively large diameters.

15 Claims, 14 Drawing Figures

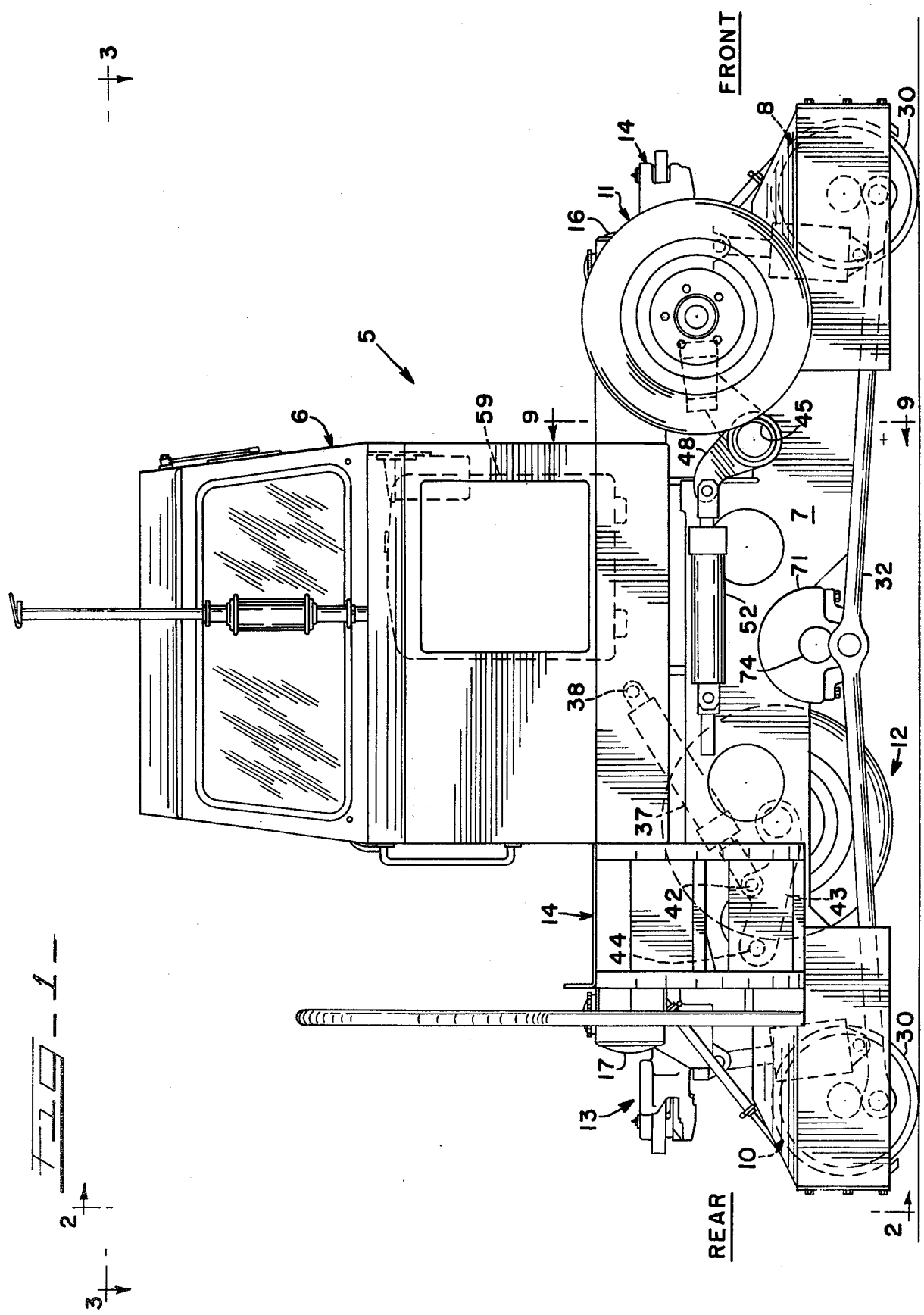

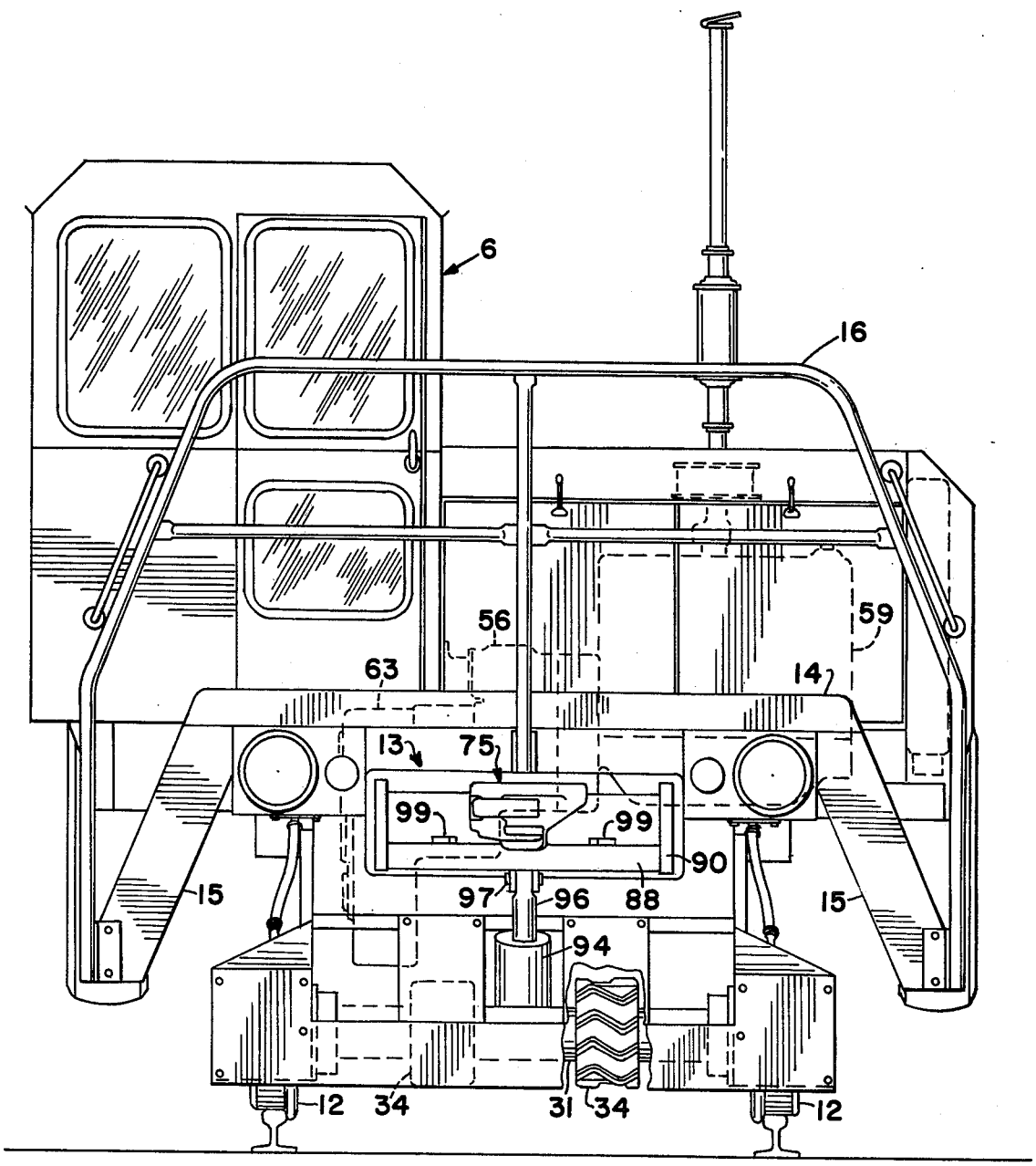

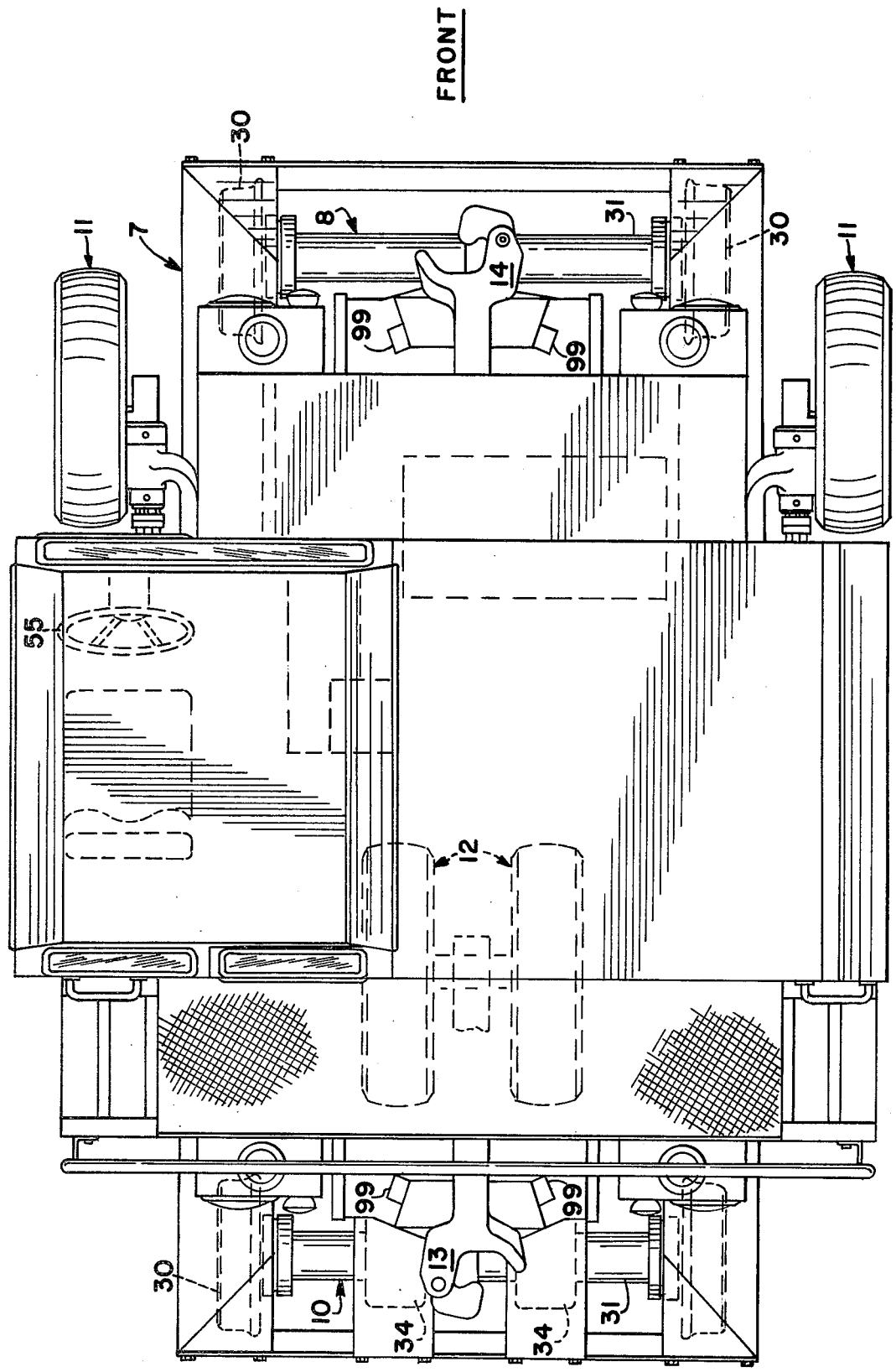

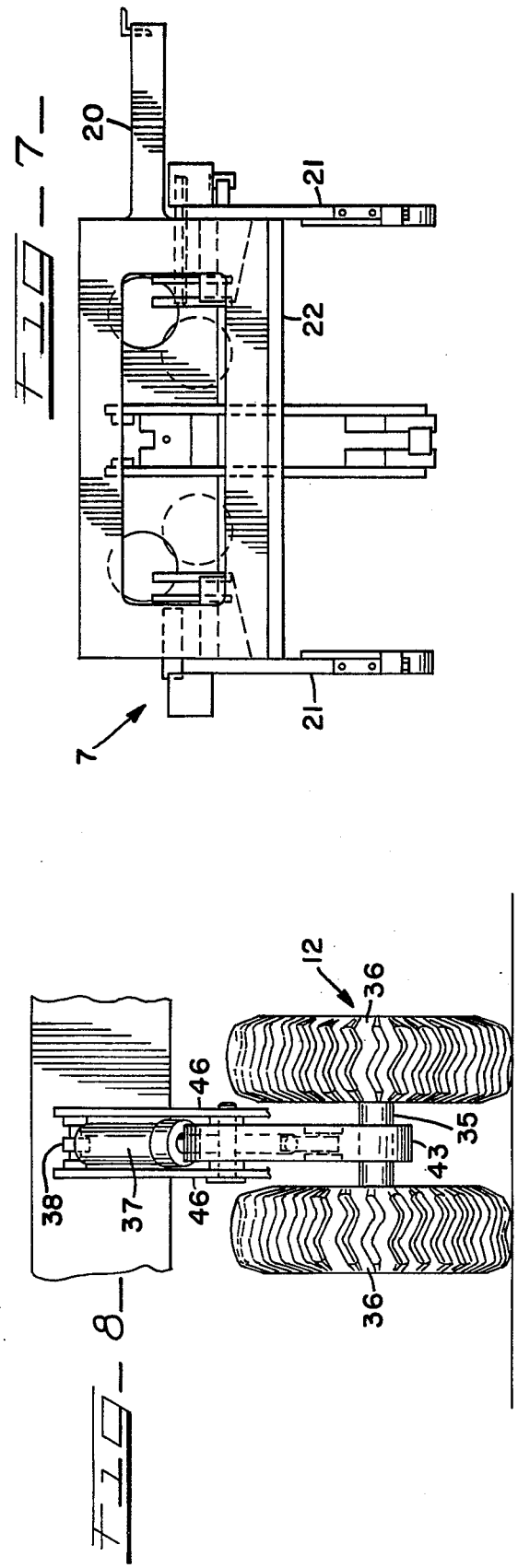

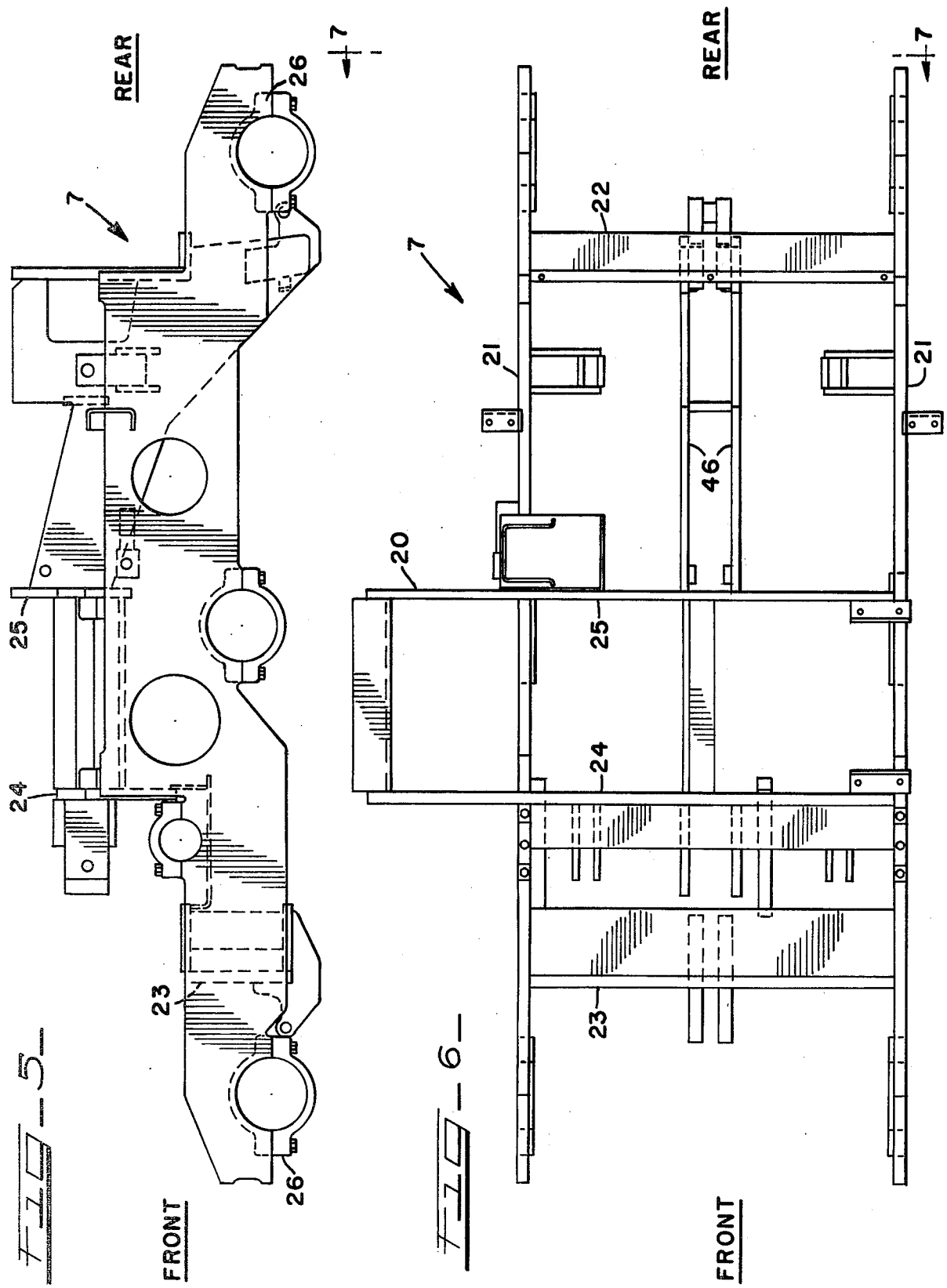

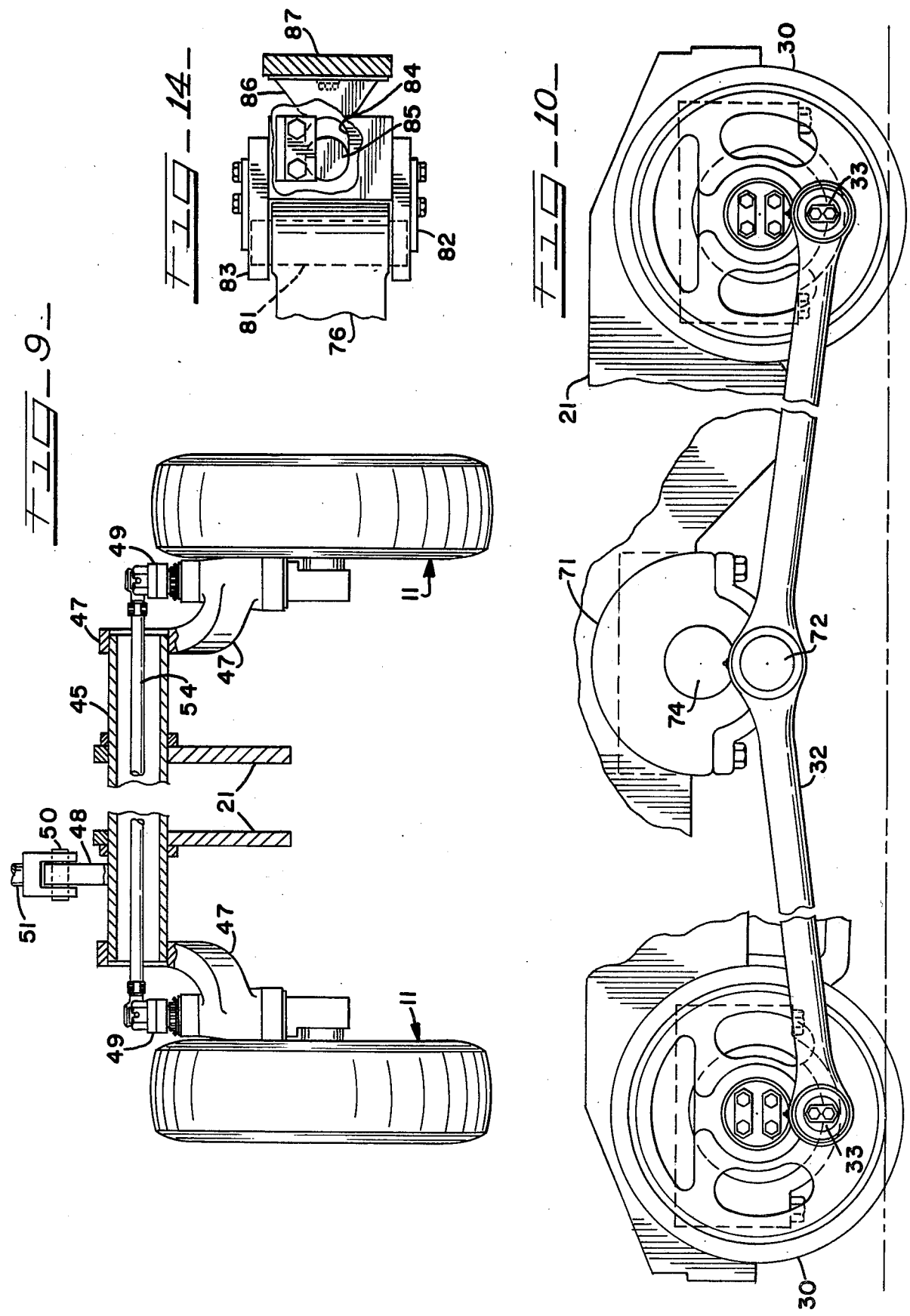

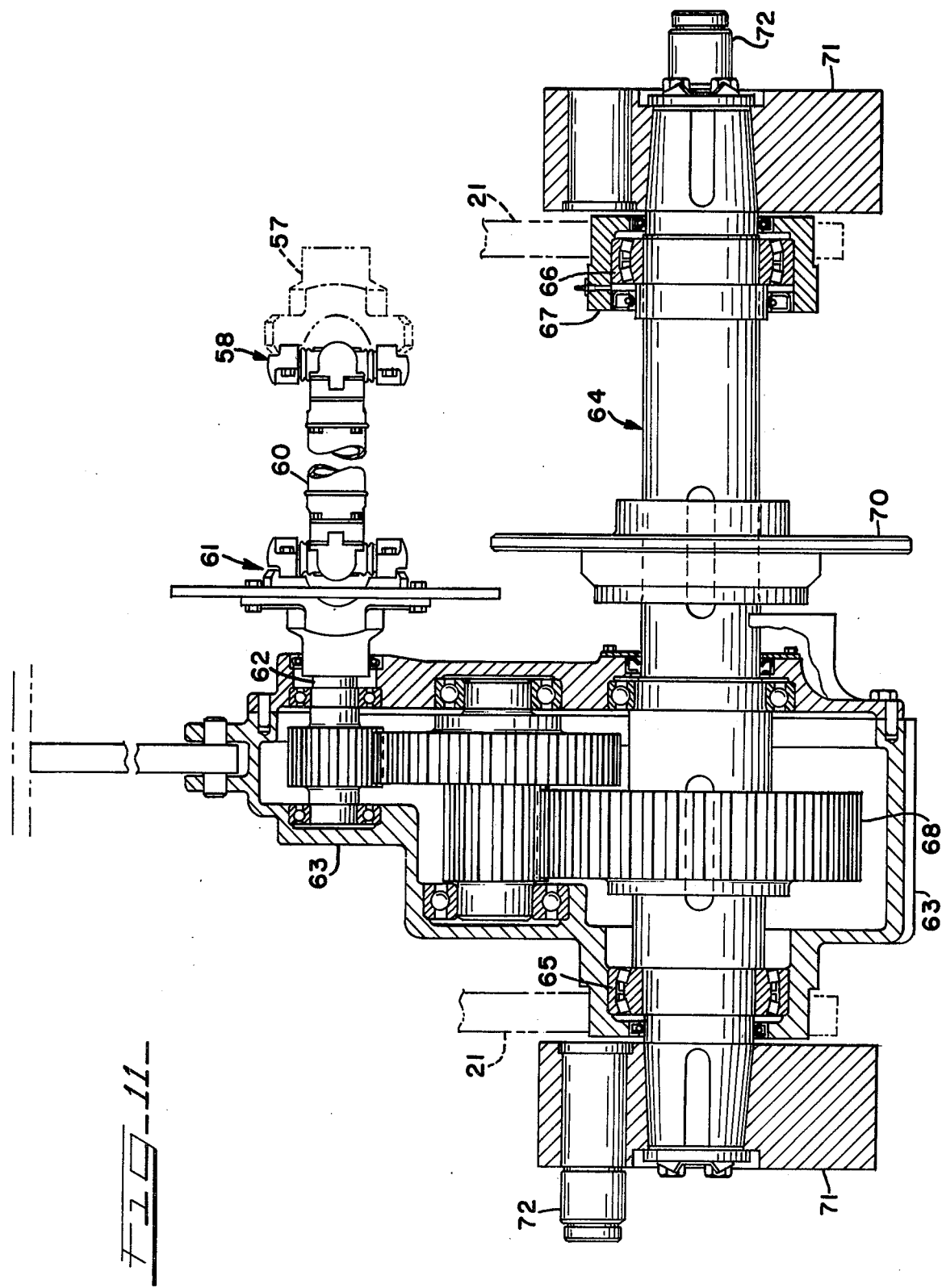

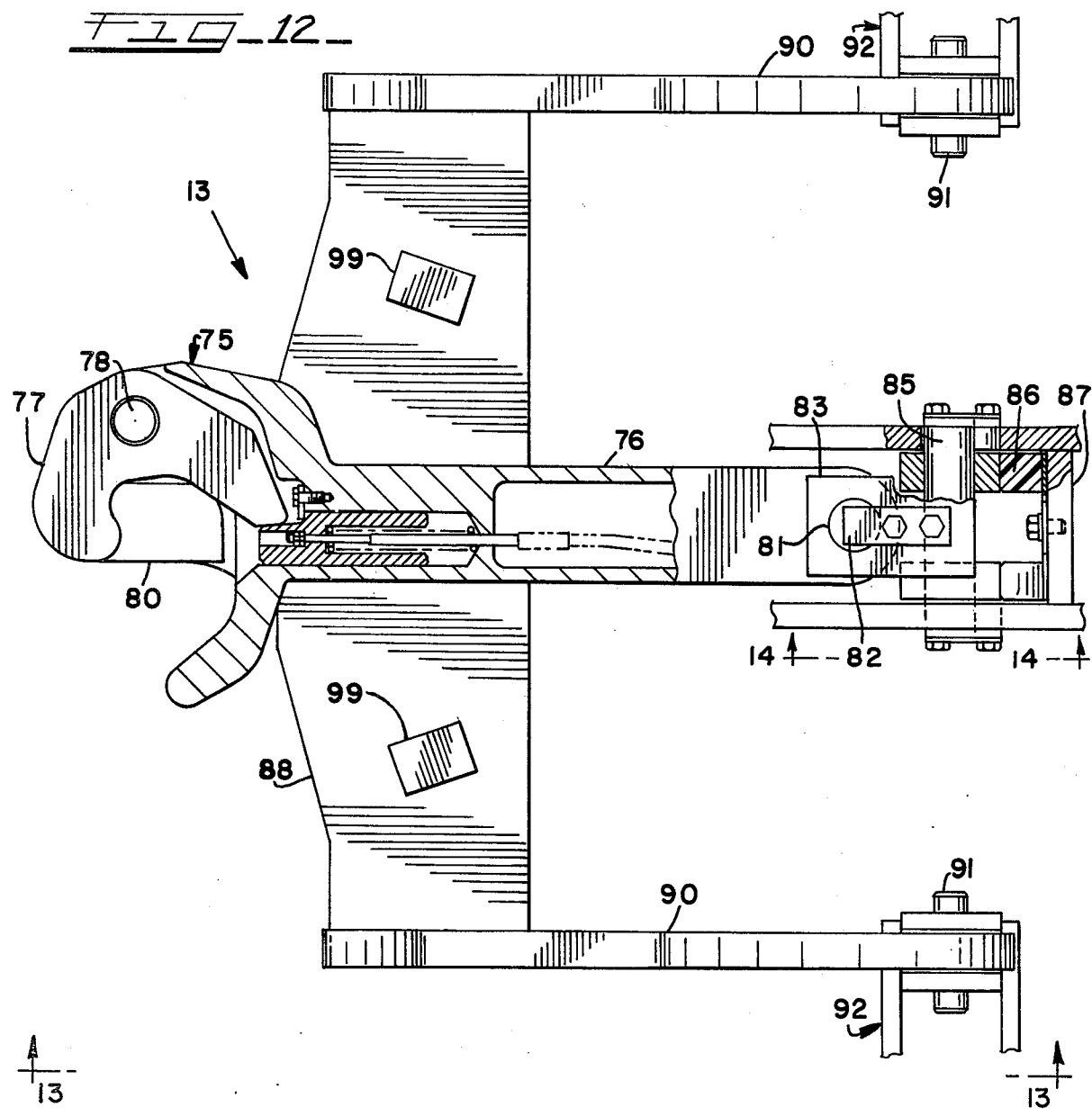
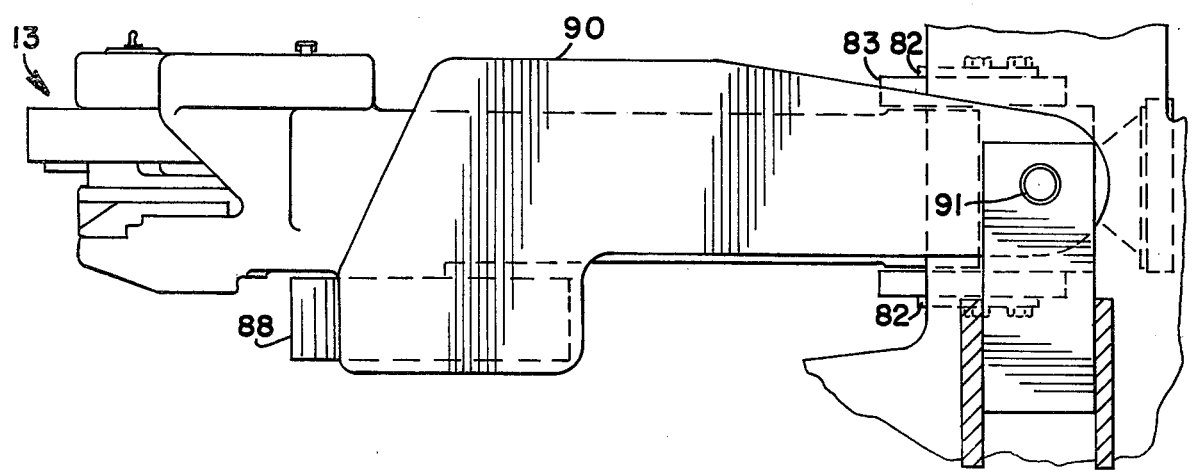

CONVERTIBLE RAILWAY CAR SHIFTING LOCOMOTIVE

The present invention relates generally to innovations and improvements in rail car moving vehicles of the class adapted for travel alternately on a rail track on rail wheels and on the ground or other surface on ground wheels, and when in the on-rail mode having the capability of transferring weight from a coupled railway car to at least one set of rail wheels so as to increase the traction and draft capabilities of the vehicle. Rail car moving vehicles of this class or type are generally known. U.S. Pat. No. 2,718,195 discloses one of the earliest forms of such a vehicle. U.S. Pat. No. 2,718,197 discloses another early form of such a vehicle in which the rail wheels and ground wheels are aligned at 180° and the solid axle on; which the rear ground wheels are mounted is driven by a chain and sprocket. U.S. Pat. No. 3,198,131 discloses such a vehicle in which the rail and ground wheels are aligned in the same direction with the ground wheels being located out board of the rail wheels. Applicant's U.S. Pat. No. 3,420,191 discloses such a vehicle in which the coupler head is mounted on rollers which run on an arcuate beam so as to swing from side to side.

As the above-identified patents indicate rail moving vehicles of the above-mentioned class and type have been known for a number of years and have undergone a series of improvements and design changes. Railway car moving vehicles of this type are in substantial demand and a number of them have been placed in use as convenient and economical alternatives to, for example, switching locomotives, for operation on railway tracks which are usually not part of mainline rail operations. The ability of railway car moving vehicles of the class and type described to maneuver on ground wheels off rail tracks and then to place themselves on rail tracks for running on flanged rail wheels has made such vehicles highly useful in a number of specialized situations which are well known.

The object of the present invention, generally stated, is the provision of a new and improved railway car moving vehicle of the above-mentioned class and type.

More specifically, among the objects of the present invention are the provision of railway car moving vehicles of the above-mentioned class and type wherein:

(1) the ground wheels have a tricycle or generally triangular configuration with relatively widely spaced steerable front ground wheels located at two points of the triangle and a pair of closely spaced non-steerable rear ground wheels positioned at the third point adapted to be driven by frictional engagement of the tire tread of such wheels with the axle of a rail wheel set of the vehicle, such configuration and driving arrangement permitting the vehicle to be propelled on the ground wheels without the necessity of a differential;

(2) the main frame members are relatively deep in vertical direction, but relatively thin or narrow in horizontal width so as to provide adequate rigidity with respect to bending or vertical loads but reduced torsional strength so as to permit sufficient twisting or torsional deflection of the frame to prevent the vehicle from derailing on curves under adverse conditions such as occur when the vehicle is pulling a heavy load from one end and the opposite end is not weighted down or coupled, so as to depend only on the built-in weight of the vehicle, the torsional deflection at each of the four corners of the vehicle should be about equal to the radial dimension of the rail wheel flange;

(3) a coupler support carrier is provided which is independently hingedly mounted to the vehicle frame for raising and lowering with the coupler resting on a rigid transverse support member which is raisable and lowerable with respect to the frame by suitable means and with the coupler itself being pivotally connected at its inner end to the frame so as to be laterally swingable while resting on the support member;

(4) having the steerable, relatively widely spaced front ground wheels mounted outboard of the frame and of the adjacent rail wheels and carried on casters on opposite ends of a pivot pipe with a tie rod interconnecting the steering arms whereby the steerable ground wheels may be raised and lowered by turning the pivot pipe on its axis without having to elevate or lower either the pivot pipe or the tie rod; and, (5) the vehicle includes a horizontal transverse driven axle operatively interconnected to the prime mover of the vehicle and located at an elevation above the axles of the fore and aft flanged rail wheel sets so as to provide adequate clearance above the road bed for a relatively large diameter final drive gear and a relatively large diameter disc brake rotor mounted on the driven axle.

Certain other objects of the invention will appear hereinafter.

For a more complete understanding of the nature and scope of the invention, reference may now be had to the following detailed description of a preferred embodiment taken in connection with accompanying drawings, wherein:

FIG. 1 is a side elevational view of a rail car moving vehicle embodying the improvements provided by the present invention with the nominal front end of the vehicle being at the right and nominal rear end thereof being at the left and with the vehicle being in its on-rail mode;

FIG. 2 is a rear end elevational view of the vehicle taken on line 2—2 of FIG. 1;

FIG. 3 is a top plan view of the vehicle taken on line 3—3 of FIG. 1;

FIG. 4 is a side elevational view corresponding to FIG. 1 with most of the cab missing and with the vehicle in its off-rail mode for travel on its lowered ground wheels;

FIG. 5 is a side elevational view of the main frame assembly of the vehicle shown in FIGS. 1-3;

FIG. 6 is a top plan view of the main frame assembly as shown in FIG. 5;

FIG. 7 is an end elevational view taken on line 7—7 of FIG. 6;

FIG. 8 is a fragmentary elevational view taken on line 8—8 of FIG. 4 showing the closely spaced non-steerable rear ground wheels of the vehicle;

FIG. 9 is a fragmentary detail view, partly in vertical section, taken generally on line 9—9 of FIG. 1 and showing the mounting of the steerable front ground wheels;

FIG. 10 is a fragmentary side elevational view on enlarged scale showing the driving arrangement for the flanged rail wheels on one side of the vehicle;

FIG. 11 is a vertical sectional view, with certain parts in elevation showing the main driven axle for the vehicle and the gear train operatively interconnecting the same with the prime mover and a disc brake rotor;

FIG. 12 is a fragmentary top plan view on enlarged scale showing the rear coupler of the vehicle shown in FIG. 1 and the mounting or support arrangement therefore;

FIG. 13 is a fragmentary side elevational view taken generally on line 13—13 of FIG. 12; and FIG. 14 is a fragmentary detailed view taken on line 14—14 of FIG. 12.

GENERAL DESCRIPTION

In FIGS. 1-4, a railcar moving vehicle is designated generally at 5 which in the travel mode illustrated in FIGS. 1 and 2 travels on flanged rail wheels on a railway track and which is capable of traveling in a second mode on ground wheels as illustrated in FIG. 4. For purposes of description the right hand end of the vehicle, as shown in FIGS. 1, 3 and 4, may be considered to be the front or forward end and the left end the rear end. The vehicle 5 is capable of traveling in either direction on either its rail wheels or its ground wheels.

In FIGS. 1-4 the vehicle cab is indicated generally at 6, the frame generally at 7, the front rail wheel set generally at 8, the rear railway set generally at 10, a pair of relatively widely spaced steerable front wheels generally at 11—11, a pair of closely spaced, non-steerable rear driven ground wheels generally at 12, a rear coupler generally at 13, and a front coupler generally at 14.

The vehicle 5 as shown in FIGS. 1-4 is provided with such customary features as a platform bridge 14 having steps 15—15 leading thereto on opposite sides and a hand and guard rail 16 so as to facilitate mounting and demounting from the vehicle and access and exit from the cab 6 by operating personnel. Front and rear headlights are indicated generally at 16 and 17, respectively. Various other optional features may be provided including flasher lights, horns, etc.

The present invention pertains to the following innovations and improvements in the rail car moving vehicle 5:

a. The triangular or tricycle configuration of the ground wheels and the disposition of the rear fixed driving wheels;

b. The frame having main members which are relatively deep in a vertical direction and thin or narrow in thickness or horizontal width so that the vehicle has high strength in bending or vertical load but adequately low torsional rigidity permitting sufficient yielding or twisting so as to prevent derailing on curves when pulling a heavy load from one end with the opposite end not being weighted down or coupled;

c. The carrier or support means for the couplers, particularly the rear coupler;

d. The mounting arrangement for the steerable, relatively widely spaced, front ground wheels including a pivot pipe supporting front wheel casters on opposite ends and through which a tie rod extends thereby allowing the front ground wheels to be raised and lowered with only rotary movement of the pivot pipe and tie rod so as not to require large openings in the frame weldment; and e. Disposition of the main driven axle at a level appreciably above the axles of the front and rear rail wheel sets thereby allowing the mounting of a relatively large diameter final drive gear on the driven axle and a relatively large diameter brake disc rotor thereon with the side rods having an inverted V configuration.

Frame

Referring to FIGS. 5-7, the welded frame assembly for the vehicle 5 is indicated therein generally at 7. Its main members comprise a pair of side plates or stringers 21—21., front and rear cross members 22 and 23, respectively, interconnecting the side members 21, transverse members 24 and 25 mounted on the top edges of the side members 21, and a cantilever frame 20 projecting beyond one of the side members 21 so as to support the front end of the engine. In addition to the designated frame members 20-25, there are additional members as shown with the entire assembly being welded together in a unified structure.

The side members 21 are provided on the undersides with suitable cut-out portions for accommodating the rail wheel sets 8 and 10 adjacent opposite ends and a main driven shaft (to be designated and described) midway between the ends.

It will be noted that the main side frame members 21 are relatively long, deep in a vertical direction, and thin or narrow in the horizontal direction, i.e. thickness. It will also be noticed that the rail wheel sets 8 and 10 are supported in bearings 26—26 on the underside of the members 21 adjacent their opposite ends. Due principally to these features the frame weld assembly 7 has ample strength with respect to bending or vertical loads while at the same time not having excessive torsional rigidity. On the contrary, the torsional strength is such as to be adequate but at the same time permitting the frame to have sufficient twisting or torsional deflection so as not to derail under adverse conditions, e.g. such as occur when the vehicle 5 is pulling a heavy load coupled to one end and the opposite end is not coupled or weighted down so as to depend only on the built-in weight of the machine to hold the unweighted or uncoupled end down on the rail. Specifically, the desirable torsional deflection in the frame 7 is about equal the depth or radial width of the rail wheel flanges, e.g. 1¼ inches.

Rail Wheels

Each of flanged rail wheel sets 8 and 10 comprises a pair of flanged rail wheels 30—30 rigidly mounted on opposite ends of an axle 31 (FIGS. 3 and 10). Each of the rail wheel sets 8 and 10 is driven from opposite sides of the vehicle 5 by side rods 32 (FIG. 10) in a manner to be described. The rear rail wheel axle 31 is provided adjacent its mid-portion with a pair of knurled driving collars 34—34 (FIGS. 2 and 3). These collars 34 are rigidly secured in known manner by keys or splines to the rail wheel axle 31 and serve to frictionally engage and drive the rear ground wheels 12 when the latter are in their lowered position (FIG. 4) in which the vehicle 5 and its rail wheel sets 8 and 10 are raised off from the railway track.

Driven Rear Ground Wheels

The rear ground wheels 12 are mounted on opposite ends of a stub shaft 35 (FIG. 8) and are usually provided with resilient tires 36—36 having tread suitable for frictional driving engagement with the collars 34. The rear ground wheels 12 are adapted to be raised and lowered by means of a hydraulic cylinder 37 pivotally connected at its upper end at 38 (FIG. 1) to the frame of the vehicle 5. The outer end of the piston rod 41 is pivotally connected at 42 to a link 43 (FIGS. 1 and 4). At one end the link 43 has welded thereto the stub shaft 35 while the opposite end of the link 43 is pivotally connected at 44 to the frame. Actuation of the hydraulic cylinder 37 produces raising and lowering of the rear ground wheels 12 on the underside of the vehicle 5.

Steerable Front Ground Wheels

The front ground wheels 11—11 are steerable as well as lowerable and raisable with respect to the frame 7 and the vehicle 5. The manner in which the front ground wheels 11 are mounted and steerable will be readily understood from a consideration of the showing thereof, and of the support and actuating means therefore, in FIGS. 1, 3, 4 and 9. A principal component of the supporting structure is the front road wheel pivot pipe 45, horizontally and transversely supported on the frame 7 by the frame members 21—21 (FIGS. 6 and 9). The pivot pipe 45 is journaled so as to be rotatable about its longitudinal axis. Caster mountings 47—47 are welded onto opposite ends of the pivot pipe 45 as shown in FIG. 9 so as to support each of the ground wheels 11 in castering relationship with the pivot pipe and the vehicle 5. A crank arm 48 is rigidly secured to the pivot pipe 45 adjacent one end. The outer end of the crank arm 48 is pivotally connected by a pin 50 to the outer end of the piston rod 51 of a hydraulic cylinder 52. The hydraulic cylinder 52 is pivotally connected at the end opposite the piston rod 51 by a pin 53 to the frame. It will be seen that by extending and retracting the piston rod 51 the pivot pipe 45 may be rotated carrying with it the caster mountings 47 and thereby raising and lowering steerable front wheels mounted thereon while the pivot pipe rotates in place.

For steering purposes, steering levers 49 for the wheels 11 are interconnected at their rear ends by a tie rod 54 (FIG. 9). One of the front wheels 11 is operatively connected in known manner to a steering wheel 55 (FIG. 3) located within the vehicle cab 6 by linkage means of known type (not shown).

Ground Wheel Tricycle Configuration

From FIG. 3 it will be noted that the front steerable wheels 11 are relatively widely spaced apart and are outboard of the sides of the frame 7. They are also outboard of the front rail wheels 30—30. On the other hand, the rear non-steerable ground wheels 12 are relatively closely spaced within or between the rear rail wheels 30—30 and also forwardly of the rear coupler 13. This configuration of the ground wheels is a generally triangular or tricycle arrangement with the front ground wheels 11 being located at two corners of the triangle and the rear ground wheels 12 located at the rear third point thereof.

This tricycle or triangular arrangement of the ground wheels 11 and 12 contributes three desirable features to the vehicle 5. First, this arrangement allows the front and rear rail wheel sets 8 and 10 to be replaced wth rail wheel sets having different gauges without interference with operation of the ground wheels. Accordingly, gauge convertibility for the vehicle 5 is provided for. Second, the triangle or tricycle configuration provides adequate stability to the vehicle 5 when it is operating in its ground travel mode but allows for steering of the vehicle in this mode without having to provide a differential between the driven rear ground wheels 12. This feature substantially reduces the cost of the vehicle as well as its maintenance. Third, the rear ground wheels 12 are positioned and operate so as not to interfere with the operation of the rear coupler unit 13.

Vehicle Drive

The vehicle 5 is powered by a motor or engine 59 (FIG. 2). The engine 59 not only provides the power for propelling or driving the vehicle 5 in both its ground travel and rail travel modes, but it also provides power for its hydraulic system as well as for the electrical system. A transmission 56 is mounted to be driven from the engine 59 with the output shaft of the transmission being indicated at 57 (FIG. 11) with one element of a universal joint indicated at 58. A drive shaft 60 interconnects the driven element or section of the universal joint 58 with a second universal joint indicated generally at 61 which serves to drive a power input shaft 62 entering the top of gear case 63. Extending transversely through the lower portion of the gear case is the main drive axle 64 of the vehicle 5. The outboard side of the gear case 63 is supported in one of the main side frames 21 and on the interior the case supports a bearing 65 of known type in which one end of the main drive axle 64 is journaled. The opposite end of the drive axle 64 is journaled in a like bearing 66 carried within a journal bearing housing 67 which in turn is mounted in the adjacent main side frame member 21.

The main drive axle 64 carries a final drive gear 68 located within the gear case 63 which has a relatively large diameter. The drive axle also carries at approximately its mid-point a disc brake rotor 70. Drive cranks 71—71 are mounted on known manner in opposite ends of the main drive axle 64. Each of the drive cranks 71 has a crank pin 72 projecting therefrom. In accordance with standard practice these drive pins will not be in alignment so that driving force or torque can always be applied by at least one of the crank arms 71 thereby avoiding a "dead center" condition.

Referring to FIG. 10, it will be seen that each side rod 32 has a generally inverted V configuration and that at the high point or apex it is journaled in known manner on one of the drive pins 72. The lower and opposite ends of each side rod 32 carry appropriate bearings by means of which they are pivotally connected in a driving relationship with crank pins 33—33 projecting outwardly from the rail wheels 30.

The elevated position of the drive axle 64 in respect to the rail wheel axles is a desirable feature since even when a side rod 32 is in its lowest operating position, it will have adequate clearance above the rails and the bottom of the gear case 63 as well as the bottom of the disc brake rotor 70 will have adequate road bed clearance. This permits use of a relatively large diameter final drive gear 68 as well as a large diameter disc brake 70. By reason of the large disc 70, an adequate braking action is obtainable by direct hydraulically-actuated pedal action without requiring auxiliary devices for brake application.

Coupler Mounting

As indicated above, the front and rear couplers 13 and 14 are supported in a novel manner and are of improved design. In this connection, it will be understood that it is not necessary to have a coupler at each end of the vehicle 5, nevertheless, having couplers at opposite ends is a matter of great convenience as can be readily appreciated. The manner in which the coupler 13 is constructed, supported and operated will be described in connection with FIGS. 1, 12 and 13. The coupler head assembly 75 and the integral coupler arm 76 may be of generally known construction. The coupler head 75 includes a knuckle 77, a knuckle pin 78 and a coupler wearing plate 80. The coupler arm 76 is pivotally mounted at its rear on a coupler pin 81 extending between upper and lower keeper plates 82—82. The keeper plates 82 retain the coupler pin 81 in place within a coupler link 83.

The link 83 at the rear is provided with an elongated horizontal slot 84 (FIG. 14) which accommodates a horizontal coupler link pin 85. The pin 85 is suitably supported by portions of the frame and is stationary while the coupler link 83 can move fore and aft an appreciable distance as permitted by the slot 84. The coupler link 83 is backed up by a coupler cushion 86 (FIG. 14) formed of a resilient rubber-like material such as polyurethane mounted at the rear on a frame member 87. Accordingly, when coupling impacts are received by the coupler head 75 they are transmitted through the coupler arm 76 and the coupler pin 81 to the coupler link 83, and the movement of the latter is cushioned adequately by the cushion 86.

The rear portion of the coupler head 75 and adjacent portion of the coupler arm 76 are supported from the underside on a relatively thick support or bed plate 88 extending between the outer ends of a pair of spaced coupler support arms 90—90. Each of the arms 90 is hingedly supported at its rear end by a pin 91 extending therethrough and carried by portions of the vehicle frame indicated generally at 92—92. Accordingly, it will be seen that the coupler arm 76 is independently pivotally connected to the frame for swinging action between the outer ends of the side arms 90 while resting on the support plate 88 and is also capable of swinging vertically on the coupler link pin 85. Thus, the coupler arm 76 has a universal joint type of mounting. On the other hand, the coupler support comprising the plate 88 and the arms 90 suitably joined together by welding or otherwise, has only upward and downward hinge-like swinging action about the pins 91.

The coupler support is actuated by means of a hydraulic cylinder 94 (FIG. 4) pivotally connected by pin 95 at its lower end to the frame and having the outer end of its piston rod 96 pivotally connected by a pin 97 between a pair of depending ears 98 carried underneath the bed plate 88. By means of the support arrangement shown for the coupler, the coupler is able to readily withstand off-center loads particularly on curves. It will also be noted that when stocks are applied to or received by the coupler head 75 and transmitted through the coupler arm 76 the shocks are not received by the coupler carrier by reason of its independent support. Blocks 99 are fastened to the top surface of the bed plate 88 and limit the swing movement of the compler arm 76.

I claim:

1. In a rail car moving vehicle adapted for travel in a first mode on a railway track on flanged rail wheels and in a second off-track mode on ground wheels, said vehicle having a front end and a rear end and including, frame means, a prime mover mounted on said frame means, a front rail wheel set mounted on said frame means, a rear rail wheel set mounted on said frame means, a front pair of steerable ground wheels, a rear pair of juxtaposed ground wheels fixed in a fore and aft direction, said ground wheels being aligned in the same direction as said rail wheels, means for raising and lowering said ground wheels with respect to said frame means so as to interchangeably convert said vehicle from one of said travel modes to the other, a rear coupler, means adjustably supporting said rear coupler on said frame means at different elevations with respect thereto for transferring weight from a rail car coupled thereto to said vehicle for increasing the traction between said rear rail wheel set and the railway track, and, power transmitting means drivably inter-connecting at least one of said rail wheel sets with said prime mover, the improvement comprising:

disposing said rear pair of ground wheels (1) forward of said rear rail wheel set and of the head of said rear coupler, (2) sufficiently close together to fit between and accommodate the gauge of the rear rail wheel set mounted on said frame means, and (3) so that when lowered for said off-track travel mode the treads thereof have frictional driving engagement with the mid-portion of the axle of said rear rail wheel set;

having said rear pair of ground wheels raisable toward the front end of said vehicle;

disposing said front pair of steerable ground wheels outboard of said frame and of the gauge of the front rail wheel set mounted on said frame means; and, said disposition of said ground wheels providing a generally triangular configuration with said rear pair of ground wheels located at the rear point of the triangle and each of said front steerable ground wheels located at one of the two front points of the triangle.

2. The improvement called for in claim 1 wherein sleeves with knurled surfaces are fixed on the axle of said rear rail wheel set in position to be frictionally engaged by the treads of said lowered rear pair of ground wheels.

3. The improvement called for in claim 1 wherein when said ground wheels are in their lowered ground-engaging mode said pair of front ground wheels are located substantially further from the front end of said vehicle than said pair of rear ground wheels are spaced from the rear end thereof, and wherein when said ground wheels are in their raised mode said pair of rear ground wheels are located substantially further from the rear end of said vehicle than said front pair of ground wheels are spaced from the front end thereof.

4. In a rail car moving vehicle adapted for travel in a first mode on a railway track on flanged rail wheels and in a second off-track mode on ground wheels, said vehicle having a front end and a rear end and including, frame means, a prime mover on said frame means, a front flanged rail wheel set mounted on said frame means, a rear flanged rail wheel set mounted on said frame means, a front pair of steerable ground wheels, a rear pair of juxtaposed ground wheels fixed in a fore and aft direction, said ground wheels being aligned in the same direction as said rail wheels, means for raising and lowering said ground wheels with respect to said frame means so as to interchangeably convert said vehicle from one of said travel modes to the other, a coupler on at least one end of said vehicle, means adjustably supporting said coupler on said frame means at different elevations with respect thereto for transferring weight from a rail car coupled thereto to said vehicle for increasing traction between at least one of said rail wheel sets and the railway track, and power transmitting means drivably interconnecting at least one of said rail wheel sets with said prime mover in said on-track mode and said rear pair of ground wheels with said prime mover in said off-track mode, the improvement wherein said means for raising and lowering said front pair of ground wheels comprises:

a front ground wheel pivot pipe mounted on said frame means for in-place rotation thereon;

caster means mounting said front ground wheels on opposite ends of said pivot pipe for rotation therewith;

a steering level connected to each of said front ground wheels; and a tie rod extending through said pivot pipe and interconnecting said steering levers.

5. The improvement called for in claim 4 wherein said tie rod extends approximately co-axially within said pivot pipe and projects beyond the opposite ends thereof to permit co-axial shifting of said tie rod during steering of said front ground wheels.

6. The improvement called for in claim 4 wherein said caster means extend forwardly and outwardly from the opposite ends of said pivot pipe.

7. In a rail car moving vehicle adapted for travel in a first mode on flanged rail wheels on a railway track and in a second off-track mode on ground wheels and including, frame means, a prime mover mounted on said frame means, a flanged rail wheel set mounted on each end of said frame means, ground wheels, means for raising said ground wheels with respect to said frame means so as to interchangeably convert said vehicle from one of said travel modes to the other, coupler means at least at one end of said vehicle, and means adjustably supporting said coupler on said frame means at different elevations with respect thereto for transferring weight from a coupled rail car to said vehicle for increasing the traction between at least one of said rail wheel sets and the railway track, the improvement comprising:

a horizontal driven axle mounted transversely on said frame means substantially mid-way between said rail wheel sets and at an elevation substantially higher than the axles of said rail sets, a relatively large diameter final drive gear mounted on said driven axle, power transmitting means including a gear train operatively connecting said final drive gear with said prime mover, drive cranks mounted on opposite ends of said driven axle, and a side rod on each side of said vehicle having an inverted V configuration and interconnecting each of said respective drive cranks in driving relationship with one pair of trailing rail wheels, the interconnection of each of said side rods to its respective drive crank and rail wheels being such that when each of said rods is in the lowest position, said final drive gear will have adequate road bed clearance.

8. The improvement called for in claim 7 wherein a relatively large disc brake rotor is mounted on said driven axle and has adequate road bed clearance.

9. The improvement called for in claim 8 wherein said final drive gear is housed in a gear case the bottom of which has approximately the same road bed clearance as said disc brake rotor.

10. In a rail car moving vehicle adapted for travel in a first mode on flanged rail wheels on a railway track and in a second off-track mode on ground wheels and including, frame means, a prime mover mounted on said frame means, a flanged rail wheel set mounted on each end of said frame means, ground wheels, means for raising said ground wheels with respect to said frame means so as to interchangeably convert said vehicle from one of said travel modes to the other, coupler means at least at one end of said vehicle, means adjustably supporting said coupler on said frame means at different elevations with respect thereto for transferring weight from a coupled rail car to said vehicle for increasing the traction between at least one of said rail wheel sets and the railway track, and power transmitting means drivably interconnecting at least one of said rail sets with said prime mover, the improvement wherein said coupler means comprises: a coupler; a coupler support; and, means for raising and lowering said coupler support; said coupler support comprising, a pair of spaced fore and aft extending side members, a bottom plate interconnecting the outer ends of said side members, means hingedly connecting the inner end of each of said side members to said frame means on a horizontal hinge axis; and, said coupler comprising a coupler head on the outer end of a coupler arm, said coupler at its outer end slidably resting by gravity on said bottom plate and at its inner end being pivotally connected to said frame means for universal swinging movement with respect to said frame means whereby forces of buff and draft received by said coupler are transmitted to said frame solely through said arm.

11. The improvement called for in claim 10 wherein the horizontal axis with respect to which said coupler has swinging movement and said horizontal hinge axis of each of said side members are substantially co-axial.

12. The improvement called for in claim 10 wherein said coupler is swingable on a horizontal pin and said horizontal pin is mounted for limited fore and aft movement and buffer means limiting its inward movement.

13. In the rail car moving vehicle called for in claim 10 said means adjustably supporting said coupler comprising a fluid-actuated cylinder pivotally mounted on said frame means under the center of said coupler bottom plate and pivotally connected to said bottom plate underneath the same mid-way between the opposite ends thereof.

14. In a rail car moving vehicle adapted for travel in a first mode on flanged rail wheels on a railway track and in a second off-track mode on ground wheels and including, frame means, a prime mover mounted on said frame means, a flanged rail wheel set mounted on and adjacent each fore and aft end of said frame means, ground wheels, means for raising said ground wheels with respect to said frame means so as to interchangeably convert said vehicle from one of said travel modes to the other, coupler means at least at one end of said vehicle, and means adjustably supporting said coupler on said frame means at different elevations with respect thereto for transferring weight from a coupled rail car to said vehicle for increasing the traction between at least one of said rail wheel sets and the railway track, the improvement wherein said frame means comprises a pair of main side members extending substantially the full length of said vehicle which have a horizontal thickness which is a small fraction of their vertical depth whereby said frame provides adequate strength with respect to vertical load and adequate torsional strength with a rigidity in torsion allowing any one of said flanged rail wheels to lift off its rail a distance approximately equal to only the radial width of its flange while the remaining three rail wheels remain on their respective rails when said vehicle is subjected to derailing loads on curves.

15. In a rail car moving vehicle adapted for travel in a first mode on a railway track on flanged rail wheels and in a second off-track mode on ground wheels, said vehicle having a front end and a rear end and including, frame means, a prime mover mounted on said frame means, a front flanged rail wheel set mounted on said frame means, a rear flanged rail wheel set mounted on said frame means, a front pair of steerable ground wheels, a rear pair of juxtaposed ground wheels fixed in a fore and aft direction, said ground wheels being aligned in the same direction as said rail wheels, means for raising and lowering said ground wheels with respect to said frame means so as to interchangeably convert said vehicle from one of said travel modes to the other, a rear coupler, means adjustably supporting said rear coupler on said frame means at different elevations with respect thereto for transferring weight from a rail car coupled thereto to said vehicle for increasing the traction between said rear rail wheel set and the railway track, and, power transmitting means drivably interconnecting said rail wheel sets with said prime mover, the improvement comprising:

- a front ground wheel pivot pipe mounted on said frame means for in-place rotation thereon;
- caster means mounting said front ground wheels on opposite ends of said pivot pipe for rotation therewith;
- a steering lever connected to each of said front ground wheels;
- a tie rod extending through said pivot pipe and interconnecting said steering levers;
- a horizontal driven axle mounted transversely on said frame means substantially mid-way between said rail wheel sets and at an elevation substantially higher than the axles of said rail sets;
- a relatively large diameter final drive gear mounted on said driven axle, power transmitting means including a gear train operatively connecting said final drive gear with said prime mover;
- drive cranks mounted on opposite ends of said driven axle;
- a side rod on each side of said vehicle having an inverted V configuration and interconnecting each of said respective drive cranks in driving relationship with one pair of trailing rail wheels, the interconnection of each of said side rods to its respective drive crank and rail wheels being such that when each of said side rods is in the lowest position, said final drive gear will have adequate road bed clearance; and
- disposing said rear pair of ground wheels (1) forward of said rear rail wheel set and of the head of said rear coupler, (2) sufficiently close together to fit between and accommodate the gauge of the rear rail wheel set mounted on said frame means, and (3) so that when lowered for said off-track travel mode the treads thereof have frictional driving engagement with the mid-portion axle of said rear rail wheel set;
- having said rear pair of ground wheels raisable toward the front end of said vehicle;
- disposing said front pair of steerable ground wheels outboard of said frame and of the gauge of the front rail wheel set mounted on said frame means; and,
- said disposition of said ground wheels providing a generally triangular configuration with said rear pair of ground wheels located at the rear point of the triangle and each of said front steerable ground wheels located at one of the two front points of the triangle.

* * * * *